(No Model.)

T. J. HOWARD.
GATE.

No. 395,976. Patented Jan. 8, 1889.

WITNESSES.
Villette Anderson.
O. R. Ferguson

INVENTOR,
Thos. J. Howard
by E. W. Anderson
his Attorney

UNITED STATES PATENT OFFICE.

THOMAS J. HOWARD, OF HIGHLAND, KANSAS.

GATE.

SPECIFICATION forming part of Letters Patent No. 395,976, dated January 8, 1889.

Application filed April 21, 1888. Serial No. 271,480. (No model.)

*To all whom it may concern:*

Be it known that I, THOMAS J. HOWARD, a citizen of the United States, residing at Highland, in the county of Doniphan and State of Kansas, have invented certain new and useful Improvements in Gates; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
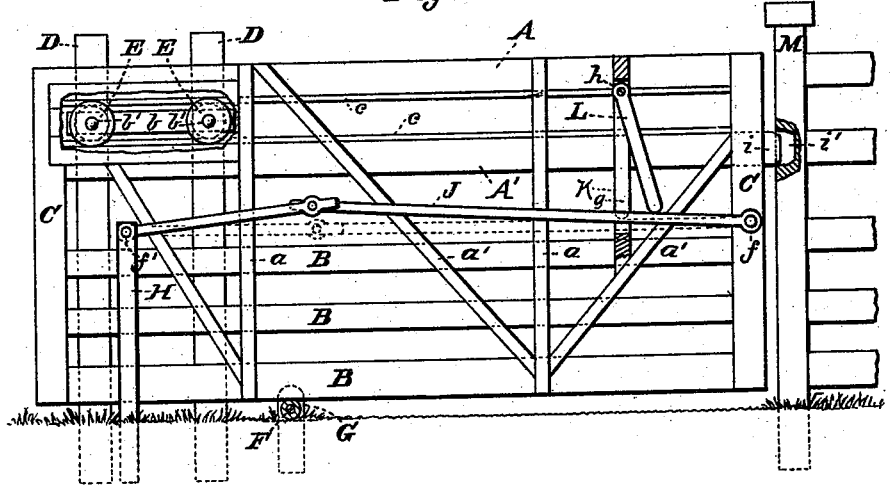
Figure 2:
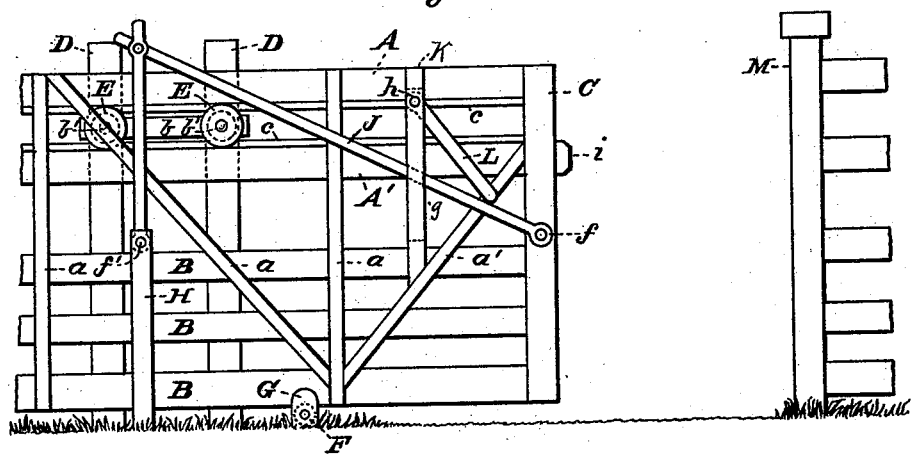

Figure 1 of the drawings is a representation of this invention, and is a front view of the inside and shows the gate ajar. Fig. 2 shows the gate open.

The invention relates to improvements in sliding gates; and it consists in the construction and novel combination of parts, as hereinafter set forth.

Referring to the drawings, A A' designate the two upper longitudinal bars of the gate.

B shows the lower bars, and C C' represent the end standards.

Vertical braces $a$ and oblique braces $a'$ are secured to the front or face of the gate, as shown.

D designates two upright posts seated firmly in the ground near the rear end of the gate at one side, braced and held together by the horizontal timber $b$. Flanged rollers E are journaled on the headed bolts $b'$, which pass into the posts D and through the timber $b$, and metal roller-ways $c$ are secured to the lower edge of the bar A and to the upper edge of the bar A', extending the entire length of said bars between the end standards. A bearing-roller, F, is journaled within the bifurcated end of short post G beneath the gate, and is designed to relieve the rollers E from part of the weight of the gate. A vertical post, H, is seated in the ground near the rear end of the gate and sufficiently away from the front thereof to allow the braces $a$ $a'$ to pass as the gate is opened or closed. A toggle-joint bar, J, is pivotally connected at its forward end, as at $f$, to the standard C', and at its opposite end to the post H, as at $f'$, the forward portion of said bar J passing through a guide-opening, $g$, in the strip K, which is secured to the bars A A' and top bar, B. The guide-opening $g$ is sufficiently long to allow for the upward movement of the bar J when the gate is opened, and a locking-block, L, having rounded ends, is loosely journaled near its upper end on the bolt or pin $h$ within the slot. When it is desired to open the gate, the block L should be turned outward on its pivot-pin, allowing the free end to rest on the upwardly-moving bar J, and when the gate is closed the block falls automatically to a vertical position within the guide-opening, thus preventing the gate from being opened by cattle. The gate-bar A has an extended end, $i$, adapted to enter a recess, $i'$, in the post M, which prevents sagging when the gate is closed.

To protect the rollers E from the action of the weather, covering-boards may be secured to the front and rear face of the bars A A'. The said covering-boards should extend only from the rear end of the gate to a point slightly beyond the forward roller.

Having described my invention, what I claim is—

1. In a sliding gate, the combination, with the rollers journaled on the upright posts, the roller-ways, the bar A, the toggle-joint bar, and the post M, of the bar A', having the extended end adapted to enter a recess in the post M, the strip K, having the guide-opening, and the locking-block pivoted within the guide-opening, substantially as specified.

2. In a sliding gate, the combination of the bars A, A', and B, the roller-way on the bars A A', the flanged rollers, the bearing-roller, the upright posts D, the bolts $b'$, the post H, the standards C C', the toggle-joint bar pivoted at one end to the standard C' and at its opposite end to the post H, the strip having the guide-opening, and the locking-block pivoted therein, substantially as specified.

In testimony whereof I affix my signature in presence of two witnesses.

THOMAS J. HOWARD.

Witnesses:
J. F. SHIELDS,
T. J. MCCREARY.